United States Patent [19]
Wolf et al.

[11] Patent Number: 4,958,812
[45] Date of Patent: Sep. 25, 1990

[54] SUSPENSION SPRING SYSTEM

[75] Inventors: Franz J. Wolf; Hubert Pletsch, both of Bad Soden-Salmünster, Fed. Rep. of Germany

[73] Assignee: WOCO Franz-Josef Wolf & Co., Fed. Rep. of Germany

[21] Appl. No.: 223,063

[22] PCT Filed: Nov. 3, 1987

[86] PCT No.: PCT/EP87/00660
§ 371 Date: Jun. 28, 1988
§ 102(e) Date: Jun. 28, 1988

[87] PCT Pub. No.: WO88/03618
PCT Pub. Date: May 19, 1988

[30] Foreign Application Priority Data

Nov. 3, 1986 [DE] Fed. Rep. of Germany ....... 3637294

[51] Int. Cl.$^5$ ............................................. F16F 3/08
[52] U.S. Cl. ................................. 267/294; 267/140.5; 267/141.2; 267/140.3; 267/153; 248/635
[58] Field of Search ............... 267/294, 141.1, 140.5, 267/141.2, 141.5, 145, 153, 292, 293, 219, 201, 257, 140, 141.3, 141.7, 140.2, 140.1, 141, 140.3; 188/376; 248/638, 634, 635, 560

[56] References Cited

U.S. PATENT DOCUMENTS

| | | | |
|---|---|---|---|
| 2,359,917 | 10/1944 | Hussman | 267/140.1 |
| 3,103,348 | 9/1963 | Paulsen | 267/153 |
| 3,245,646 | 4/1966 | Baratoff | 267/141 |
| 3,883,101 | 5/1975 | Vernier | 267/140.1 |
| 3,957,127 | 5/1976 | Bouchard et al. | 180/64 R |
| 4,194,255 | 3/1980 | Poppe | 267/153 |
| 4,199,128 | 4/1980 | Boom et al. | 267/140.1 |
| 4,458,888 | 7/1984 | Wolf et al. | 267/140.1 |
| 4,572,490 | 2/1986 | Alciati | 267/140.1 |
| 4,711,423 | 12/1987 | Popper | 248/635 |
| 4,750,720 | 6/1988 | Wolf et al. | 267/292 |

FOREIGN PATENT DOCUMENTS

| | | | |
|---|---|---|---|
| 0110233 | 6/1984 | European Pat. Off. | 267/141 |
| 0118887 | 9/1984 | European Pat. Off. | |
| 0681627 | 9/1939 | Fed. Rep. of Germany | 267/141 |
| 0860878 | 3/1951 | Fed. Rep. of Germany | |
| 836418 | 3/1952 | Fed. Rep. of Germany | |
| 1104766 | 4/1961 | Fed. Rep. of Germany | 267/294 |
| 1110475 | 7/1961 | Fed. Rep. of Germany | |
| 1903237 | 10/1969 | Fed. Rep. of Germany | |
| 2640937 | 3/1977 | Fed. Rep. of Germany | 188/376 |
| 3439614 | 4/1986 | Fed. Rep. of Germany | |
| 3608934 | 9/1987 | Fed. Rep. of Germany | |
| 0806357 | 12/1936 | France | 267/294 |
| 817656 | 9/1937 | France | |
| 1327065 | 4/1963 | France | |
| 1453835 | 8/1966 | France | |
| 0563799 | 2/1957 | Italy | 267/141.3 |
| 0093533 | 5/1984 | Japan | 267/141 |
| 0191967 | 10/1964 | Sweden | 267/294 |
| 268622 | 5/1950 | Switzerland | |
| 915093 | 1/1963 | United Kingdom | |
| 2027517 | 2/1980 | United Kingdom | 267/141.2 |

Primary Examiner—Andres Kashnikow
Assistant Examiner—Mark T. Le
Attorney, Agent, or Firm—Lowe, Price, LeBlanc, Becker & Shur

[57] ABSTRACT

A suspension spring system includes a housing, a suspension spring located in the housing and a bistable control spring located in the housing. A load supporting member is positioned at least partially within the housing and is movable with respect to the housing. The control spring is radially compressed within the housing so that the control spring is prestressed. The control spring is shiftable between two stable final positions and is, thus, able to influence and control the spring characteristics of the suspension spring.

25 Claims, 3 Drawing Sheets

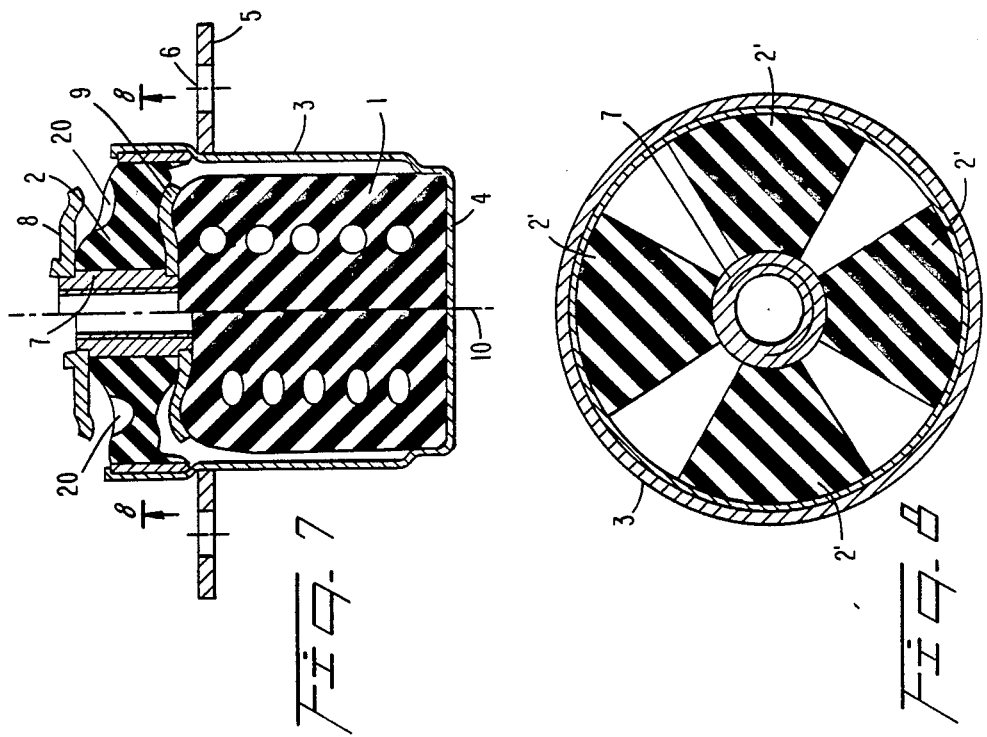
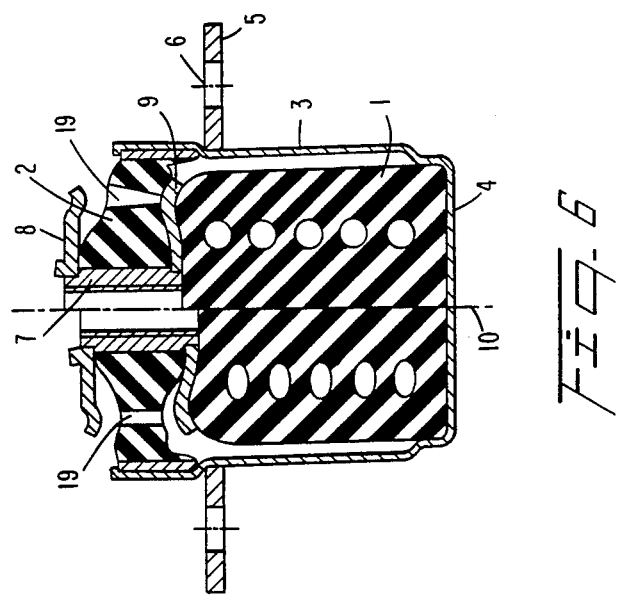

SUSPENSION SPRING SYSTEM

BACKGROUND OF THE INVENTION

The present invention relates to a suspension spring system.

Especially, the invention relates to a spring system with a soft suspension spring, whereat said soft suspension spring is a tension spring or a pressure spring.

Soft suspension springs with a flat linear force-deflection curve are theoretically perfect for supporting and suspension purposes in numerous applications. Practically, however, their use almost always fails because the spring strokes are too large, because the material of the soft suspension spring, which may be spring steel or elastomer material, the high local loads connected therewith, and because the hard action of the necessary end stop means limit the spring stroke.

Similar problems arise when using stiffer and mechanically more rigid suspension springs that undergo large, especially dynamic loads.

Thus, the invention is designed to provide a suspension spring system which, particularly when using a soft and/or highly loaded suspension spring, shows a high mechanical stability under load and a long working life even when undergoing dynamic loads. Additionally, when leaving the linear working range, the limitation of the spring stroke is to start softly without any hard stop characteristics without having to use soft stop buffers which would have to undergo too high requirements with respect to their mechanical stability.

OBJECTS AND SUMMARY OF THE INVENTION

For solving this problem, a suspension spring system according to the present invention includes a bistable control spring coupled to a suspension spring, wherein both stable final positions of said control spring are on top of each other with respect to the direction of the spring deflection path of the suspension spring.

The suspension spring system according to the present invention comprises two essential and fundamental advantages: (1) The control spring may have a high or very high mechanical rigidity, so that the control spring is able to protect effectively a soft suspension spring without changing significantly by the unstable range of its force-deflection curve the force-deflection curve of the suspension spring within the coupled range. (2) The control spring used in a suspension spring system according to the present invention shows a force-deflection curve starting from a first overstretched final range, followed by a first stable final range, then changing from an unstable intermediate range showing practically almost a zero spring rate followed by the range of the restoring force of the control spring to a second stable final range, followed again by a second overstretched final range. In a suspension spring system according to the present invention, this force-deflection curve of said control spring is acting additively to the force-deflection curve of the suspension spring, so that a person skilled in the art constructing a suspension spring system according to the principles of the present invention has practically unlimited possibilities for influencing the force-deflection curve of the suspension spring system by choosing the working range of the spring characteristics of the control spring according to the respective application.

Preferably, the control spring is used such that the unstable neutral range of the control spring with respect to the spring deflection path, which is in-between the two stable final positions of the control spring, is within the working range of the suspension spring, which in most applications will be linear. For realizing such a suspension spring system, a person skilled in the art will find a large number of possible spring combinations without any problems. Preferably, the suspension spring system is formed such that the suspension spring is a pressure spring or a tension spring and the control spring is either a pressure or a tension spring radially pre-stressed with respect to the suspension spring, or a pressure or tension spring system consisting of several pressure or tension springs with or without inserted lever systems, or a disc spring, or a bistable leaf spring.

Especially, when the suspension spring system is used as an axial bearing or a suspension bearing, the suspension spring is preferably a rubber buffer, the load supporting member of which is coupled centrally to a rubber disc or a rubber disc spring pre-stressed radially compressively with respect to a stationary load transferring member.

Particularly, when the rubber buffer serving as a suspension spring consists of an extraordinarily soft elastomer material or a rubber spring with cavities inside, an extremely soft, but, at the same time, extremely stable and mechanically rigid bearing is achieved by using a control spring pre-stressed according to the requirements. Such a bearing changes gradually softly and without any end stop characteristics from the linear working range of the suspension spring to a limiting progressive range, if the elasticity of the control spring is dimensioned accordingly.

However, the control spring is not only able to influence and control the spring characteristics and the force-deflection curve of the suspension spring undergoing an axial load, but it can also simply compensate asymmetric radial loads by a corresponding asymmetric construction. For realizing the compensation of radial loads, a person skilled in the art will once again easily find many possibilities. When using a compressively pre-stressed disc-type rubber control spring, a differentiated compensation is particularly simple in that the disc-type rubber control spring includes axially extending cavities, recesses, channels or openings. These cavities weaken the restoring force of the disc-type rubber control spring with respect to a radial direction according to the distribution of the cavities, wherein these cavities, recesses, channels or openings may be open at both sides, which means that they pass through the spring, or closed at one side. Additionally, an asymmetric distribution of the radial spring forces of the control spring can be easily achieved by a differentiated thickness of the disc-type rubber control spring.

For special applications, when a soft suspension spring and a control spring, which is not very stiff, are required at the same time to realize a certain predetermined spring characteristic curve of a suspension spring system, the axial spring stroke of the control spring, axial with respect to the suspension spring, can be limited by end stop means, too. Since such end stop means that limit the spring stroke of the control spring are only acting indirectly and partially upon the force-deflection curve of the whole suspension spring system, such end stop means are not critical for most applications. When using disc-type control springs, the end stop means for limiting the spring stroke of the control spring are preferably formed as disc-type means which are attached rigidly or elastically to the load supporting member above and below the control spring and at least essentially parallel to the control spring.

Preferably, such end stop means for limiting the spring stroke of the control spring are provided when, according to a further embodiment of the invention, the control spring is an annular disc-type spring made of an elastomer material, which is radially pre-stressed and which encloses the soft suspension spring of the spring system peripherally. In addition to that control spring, a suspension spring is preferably arranged within a two-part housing. The two housing parts are beaker-type or bell-type and overlap each other axially allowing a certain radial free motion such that the control spring is fixed and radially pre-stressed between the overlapping surface areas of the two housing parts. In this embodiment of a suspension spring system, the end stop means limiting the spring stroke of the control spring are preferably formed directly from and are parts of the surface areas of the housing parts.

BRIEF DESCRIPTION OF THE DRAWINGS

In the following, the invention is described more in etail with an embodiment of the invention together with the accompanying drawings, and wherein

FIG. 6 is a longitudinal cross-sectional view similar to FIG. 1 of a further embodiment of a suspension spring system according to the present invention showing the control spring in the form of a rubber disc having axially extending channels therein;

FIG. 7 is a longitudinal cross-sectional view similar to FIG. 1 of another embodiment of a suspension spring system according to the present invention showing the control spring in the form of a rubber disc having axially extending cavities therein; and FIG. 8 is a slightly enlarged cross-sectional view along the line 8—8 of FIG. 7 showing the plurality of pressure springs that define a pressure spring system.

DETAILED DESCRIPTION OF THE PREFERRED EMBODIMENTS

Figure 1:
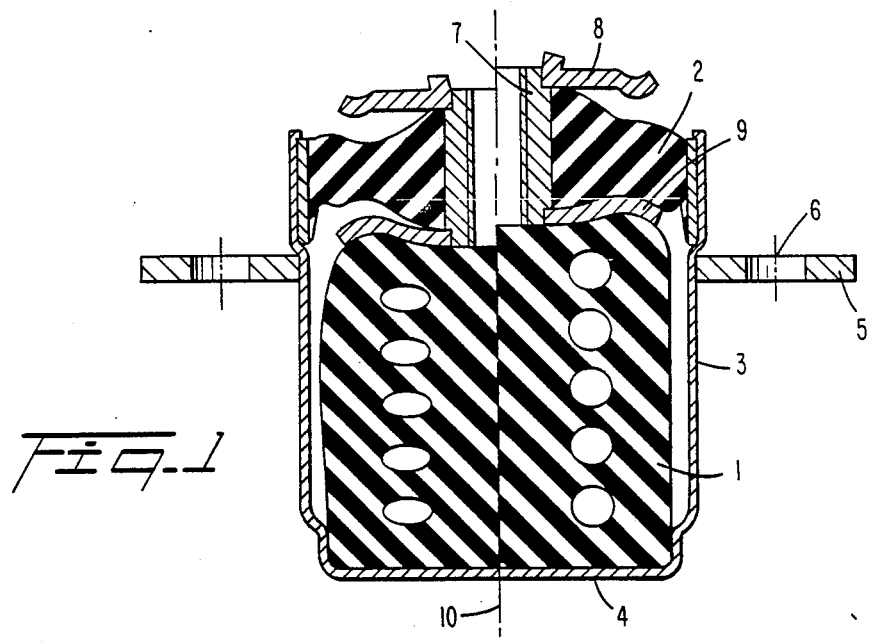
FIG. 1 is a longitudinal cross-sectional view of an embodiment of a suspension spring system according to the invention, wherein the portion on the left of the central axis is statically loaded and the portion on the right of the central axis is unloaded.

The suspension spring system shown schematically in FIG. 1 consists essentially of a suspension spring 1 and a control spring 2. The suspension spring 1 is a cylindrically shaped rubber buffer with cavities inside, which is arranged in a beaker-type housing 3, the bottom 4 of which serves as a load transferring member to the suspension spring 1. The housing 3 may comprise for example an outer flange 5 with bores 6, by which the housing 3 can be attached rigidly to a reference system, for example an engine frame.

The control spring 2 is a disc-type rubber member which is at least essentially symmetrical with respect to its horizontal main plane. The control spring 2 is formed thicker around a central sleeve 7 serving as a load supporting member of the suspension spring system than at its outer edges.

At both ends of the sleeve 7, disc-type members 8,9 having a certain profile are fixed, which serve as end stop for means limiting the spring stroke of the control spring 2.

Figure 2:
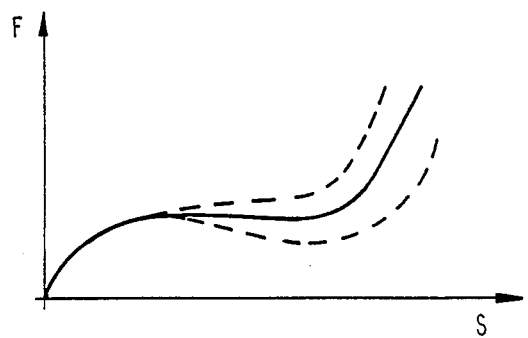
FIG. 2 is the force-deflection curve of the spring characteristics of a control spring as shown in FIG. 1.

The control spring 2 is pre-fabricated separately. Not pre-stressed, the control spring comprises an outer diameter, which is larger than the inner diameter of the housing 3 at that place, where the control spring 2 is inserted as can be seen from FIG. 1. This means, that the control spring 2 is radially compressively pre-stressed when it is inserted into the upper rim of the housing 3. If there is no obstruction, the control spring 2 tries to evade that deformation by curving axially concavely or convexly, whereat both ways of curving result in a certain minimum of remaining stress which is the same in both directions. Thus, the control spring 2, which is radially pre-stressed as can be seen from FIG. 1, comprises two stable final positions which are equivalent with respect to its energy, which means it is "bistable". When converting the control spring 2 from its one final position to its other, which happens, for example, when the convex final position is "pressed" to the concave final position, an unstable intermediate range will be passed, which range is characterized in its center by a symmetric distribution of the deformation stress at both sides of the main plane of the stress-loaded control spring 2. In this range, the axial spring rate of the control spring 2 is practically about zero. Not until this unstable range, which corresponds to the range of the maximum deformation of the spring, has been passed, a spontaneous restoration of the control spring 2 into the second final position, which is in this embodiment the concavely curved final position, takes place. The specific course of the force-deflection curve of the control spring 2 depends primarily from the compressive stress acting upon the control spring 2 and secondarily from the profile of the control spring 2. Typical spring characteristics of such control springs are shown schematically in FIG. 2. In that illustration, the more or less negatively extending sections of the force-deflection curve correspond to the spontaneous restoring or "turning-over" of the pre-stressed control spring 2 into the second stable final position, and the progressive rising sections of the curve in the right part of FIG. 2 correspond to the concave overstretching of the control spring.

In the illustration of FIG. 1, right from the center line 10, the control spring 2 is shown in its convex stable final position when the suspension spring system is unloaded. Left from the center line 10, the control spring 2 is shown in its unstable neutral position when the suspension spring system is loaded.

As can be seen from FIG. 1, the suspension spring itself is a cylindrical rubber block comprising cavities, which rubber block is dimensioned such that it sits close directly or indirectly, which means separated by a disc-type member 9, to the control spring 2 being unstressed in its upper final position. In this arrangement, the suspension spring 1 is not pre-stressed or only minimally axially pre-stressed. It can be seen easily by a person skilled in the art, that the pre-stress of the springs 1 and 2 can be predetermined easily within any range according to the requirements of the specific applications.

Figure 3:
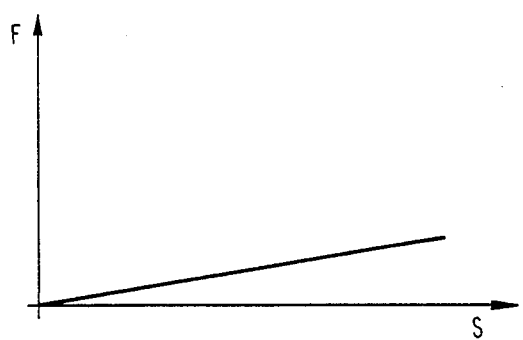
FIG. 3 is the force-deflection curve of a soft rubber suspension spring as shown in FIG. 1.

Without comprising any control spring, the rubber block with cavities inside serving as a suspension spring 1 shows the force-deflection curve as can be seen from FIG. 3, wherein the working range is used for the suspension spring system of FIG. 1. In FIG. 3 as well as in FIGS. 2 and 4, the reference letter F means spring force and the reference letter s means spring stroke.

When assembling and coupling the suspension spring 1 and the control spring 2, as can be seen from FIG. 1, the characteristic force-deflection curve of the suspension spring 1 and of the control spring 2 are added to result in a characteristic curve of the suspension spring system. The typical course of such a characteristic curve of a suspension spring system according to FIG. 1 is shown graphically in FIG. 4. That force-deflection curve is characterized by an extremely soft, which means flat linear working range, which, if required, can be formed even softer than the suspension spring 1 can provide by itself, and which changes gradually and softly to the following progressive range. However, of much more importance than the soft changing into the progressive range is the effect, that the extremely soft linear characteristic curve can be used permanently by relatively high loads, because a much more rigid and resistant elastomer material can be used than it is possible when realizing a force-deflection curve according to FIG. 3 for the suspension spring 1 by itself.

Assuming that the suspension spring system shown in FIG. 1 right from the center line 10 corresponds to the unloaded state of the suspension spring system as described above. Further assuming that when having a static load, the suspension spring system converts to the state shown in FIG. 1, left from the center line 10. This would correspond to a static operating point, which is about in the center range of the linear section of the force-deflection curve of the suspension spring system shown in FIG. 4. Vibrations of that load acting relative to the load transferring member 4 in both axial directions can be cushioned extraordinarily softly by the suspension spring system described above, wherein the suspension spring 1 itself is only minimally mechanically loaded.

Figure 4:
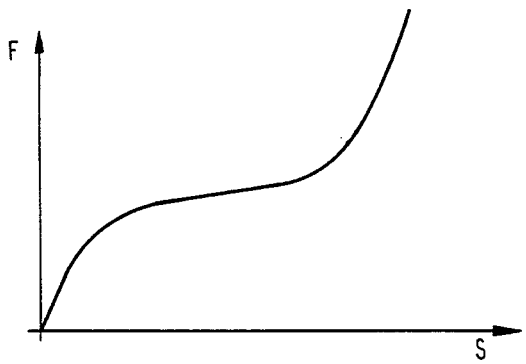
FIG. 4 is the force-deflection curve of a suspension spring system as shown in FIG. 1, achieved by addition of a force-deflection curve of a control spring according to FIG. 2 and a force-deflection curve of a suspension spring according to FIG. 3.

It can be seen easily from the specification above, that, for example, by changing the dimensions, the material characteristics of the springs 1,2 and/or the pre-stress which has to be adapted to the specific requirements, the operating point can be shifted from the center of the linear section of the characteristic curve shown in FIG. 4 to the left or right edge or beyond. Where such operating points have to placed depends only from the specific requirements of the application and can easily be determined by a person skilled in the art in standard tests.

Figure 5:
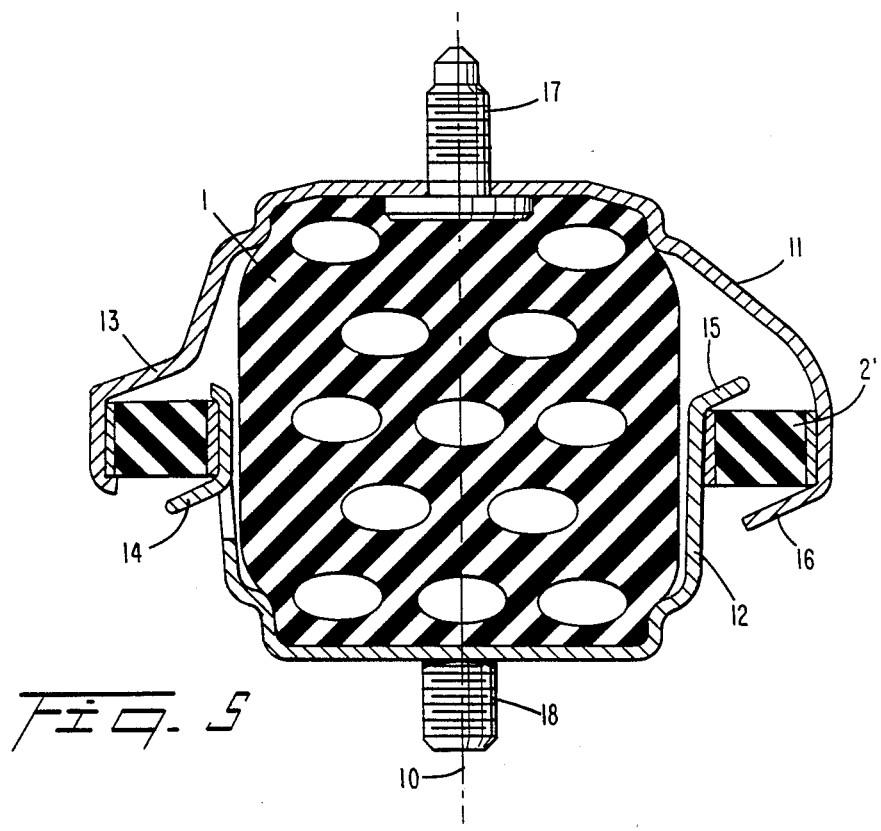
FIG. 5 is a longitudinal cross-sectional view of a further embodiment of a suspension spring system, wherein the cutting planes of the left part and the right part of this figure are rotated 90° with respect to each other along the central axis of the suspension spring system.

In FIG. 5 there is shown a further embodiment of a suspension spring system. In the longitudinal section of FIG. 5, the cutting plane left from the center line 10 and right of the center line 10 are rotated by 90° around the center line with respect to each other such that when one of the two cutting planes is within the drawing plane, the other cutting plane is perpendicular with respect to the drawing plane and intersects the drawing plane along the center line.

The housing of the suspension spring system consists of two beaker-type or bell-type housing parts being open axially towards each other and overlapping each other telescopically. In the following, these housing parts are called "load supporting housing parts" 11 and "load transferring housing part" 12.

In the illustration of FIG. 5, the suspension spring system is shown undergoing a certain static load neither shown nor referenced in FIG. 5. This means, that the illustration shown in FIG. 5 corresponds to the illustration shown in FIG. 1, left from the center line 10.

An annular disc-type control spring 2' is fixed under a radial compressive force between the sections of the housing 11,12 overlapping each other and is thus allowed a certain radial free motion. End stop means limiting the spring stroke 13,14, respectively 15, 16, for limiting the positive (13,14) and negative (15,16) deflection range of the control spring are formed uniformly angularly spaced and alternatingly at the two housing parts overlapping each other. The end stop means 13,14,15,16 are formed by inclined surface areas, which are parallel and complementary with respect to each other and which surface areas are dimensioned such that, on the one hand, they avoid an excessive curvature of the annular disc-type control spring pre-stressed in an unstable position, and, on the other hand, they do not effect a sudden and hard limiting of the spring stroke of the control spring, but a gradually progressive rising of the characteristic curve, wherein the control spring is undergoing a tensile load.

The embodiment of the suspension spring system shown in FIG. 5 is a particularly robust and compact bearing for motor suspension, which is nearly closed in itself. The bearing comprises a threaded bolt 17 for tightening the load, which means here the engine, and the threaded bolt 18 for connecting the bearing to the frame part supporting the motor block or the engine.

The construction of the suspension spring and the possibilities of adjusting the characteristics of the bearing correspond to the characteristic features described above with respect to the illustration of FIG. 1.

As mentioned earlier, the bistable control spring can be adapted to not only control and influence the spring characteristics of the suspension spring in response to axial loads but in addition, to compensate asymmetric radial loads. In order to achieve that latter objective, the control spring 2 can be manufactured in the form of a rubber disc having a plurality of axially extending channels 19 located therein as seen in FIG. 6. Alternatively, the control spring 2 could be manufactured in the form of a rubber disc having a plurality of axially extending cavities 20 located therein in a manner such as that illustrated in FIG. 7.

As shown in FIG. 8 and as mentioned previously, the bistable control spring can also be manufactured as a pressure spring system comprised of a plurality of pressure springs 2.

While the invention has been described and illustrated in accordance with preferred embodiments, it is recognized that variations and changes may be made and equivalents employed herein without departing from the invention as set forth in the claims.

We claim:

1. A suspension spring system comprising:
   a housing;
   a load supporting member at least partially positioned within said housing and movable with respect to said housing;

a suspension spring located in said housing, said suspension spring comprising a soft rubber spring having a plurality of cavities located therein, said suspension spring being compressible in an axial direction;

a disc-shaped bistable control spring means located in said housing for influencing and controlling the spring characteristics of said suspension spring, said disc-shaped bistable control spring means comprising at least one pressure spring, said disc-shaped bistable control spring means being mounted on said load supporting member and being radially compressed within said housing so as to be prestressed, said disc-shaped bistable control spring means being shiftable between two different final positions in response to movement of said load supporting member, both of said final positions being stable and being located along the axis of compression of said suspension spring.

2. A suspension spring system in accordance with claim 1, wherein said disc-shaped bistable control spring means comprises a rubber disc having axially extending cavities therein.

3. A suspension spring system in accordance with claim 1, wherein said disc-shaped bistable control spring means comprises a rubber disc having axially extending passing channels therein.

4. A suspension spring system in accordance with claim 1, wherein said disc-shaped bistable control spring means comprises several pressure springs that define a pressure spring system.

5. A suspension spring system in accordance with claim 1, wherein said disc-shaped bistable control spring means moves through an intermediate range as the disc-shaped bistable control spring means shifts from one of said final stable positions to the other of said final stable positions, said disc-shaped bistable control spring means being unstable in the intermediate range.

6. A suspension spring system comprising:
a housing;
a load supporting member at least partially positioned within said housing and movable with respect to said housing;
a suspension spring located in said housing, said suspension spring comprising a soft rubber spring having a plurality of cavities located therein, said suspension spring being compressible in an axial direction; and
a disc-shaped bistable control spring means located in said housing for influencing and controlling the spring characteristics of said suspension spring, said disc-shaped bistable control spring means comprising at least one pressure spring, said disc-shaped bistable control spring means being mounted on said load supporting member and being radially compressed within said housing so as to be prestressed, said disc-shaped bistable control spring means being shiftable between two different final positions in response to movement of said load supporting member, both of said final positions being stable and being located along the axis of compression of said suspension spring; and
at least one end stop means associated with said disc-shaped bistable control spring means for limiting an effective spring stroke of said disc-shaped bistable control spring means.

7. A suspension spring system in accordance with claim 6, comprising two end stop means, each end stop means being attached to said load supporting member and said disc-shaped bistable control spring means being positioned between said two end stop means.

8. A suspension spring system in accordance with claim 7, wherein each of said end stop means comprises a disc.

9. A suspension spring system in accordance with claim 6, wherein one end of said suspension spring is positioned against a load transferring member of said housing which is defined by a bottom portion of said housing and an opposite end of said suspension spring contacts said end stop means.

10. A suspension spring system in accordance with claim 6, wherein said disc-shaped bistable control spring means moves through an intermediate range as the disc-shaped bistable control spring means shifts from one of said final stable positions to the other of said final stable positions, said disc-shaped bistable control spring means being unstable in the intermediate range.

11. A suspension spring system comprising:
a housing;
a load supporting member at least partially positioned within said housing and movable with respect to said housing;
a suspension spring located in said housing, said suspension spring comprising a soft rubber spring having a plurality of cavities located therein, said suspension spring being compressible in an axial direction; and
disc-shaped bistable control spring means located in said housing for influencing and controlling the spring characteristics of said suspension spring, said disc-shaped bistable control spring means comprising at least one pressure spring, said disc-shaped bistable control spring means being radially compressed within said housing so as to be prestressed, said disc-shaped bistable control spring means being shiftable between two different final positions in response to movement of said load supporting member, both of said final positions being stable and being located along the axis of compression of said suspension spring; and
at least one end stop means associated with said disc-shaped bistable control spring means for limiting an effective spring stroke of said disc-shaped bistable control spring means, said end stop means comprising a disc attached to said load supporting member and extending in a direction transverse to the direction of compression of said suspension spring.

12. A suspension spring system in accordance with claim 11, comprising two end stop means attached to said load supporting member, said disc-shaped bistable control spring means being positioned between said two end stop means.

13. A suspension spring system in accordance with claim 11, wherein said disc-shaped bistable control spring means moves through an intermediate range as the disc-shaped bistable control spring means shifts from one of said final stable positions to the other of said final stable positions, said disc-shaped bistable control spring means being unstable in the intermediate range.

14. A suspension spring system comprising:
a housing formed by two housing parts, one of said housing parts being axially and telescopingly positioned within the other housing part so that the one housing part is radially movable with respect to the other housing part, portions of the one housing part overlapping portions of the other housing part;

a suspension spring located in one of said housing parts; and an annular, disc-shaped bistable control spring means positioned between the portions of the housing parts which overlap each other for influencing and controlling the spring characteristics of the suspension spring, said disc-shaped bistable control spring means being radially compressed between said overlapping portions so as to be pre-stressed, said disc-shaped bistable control spring means being shiftable between two different final positions in response to movement of said housing parts relative to one another, both of said final positions being stable and being located along the axis of compression of said suspension spring, said housing parts including end stop means for limiting an effective spring stroke of said disc-shaped bistable control spring means.

15. A suspension spring system in accordance with claim 14, wherein said end stop means comprises spaced, inclined surfaces located on portions of said housing parts which overlap each other.

16. A suspension spring system in accordance with claim 15, wherein the spaced inclined surfaces of said one housing part extend over one side of said disc-shaped bistable control spring means at first locations and extend over an opposite side of said disc-shaped bistable control spring means at second locations, the inclined surfaces of said other housing part extend over said opposite side of said disc-shaped bistable control spring means at said first locations and extend over said one side of said disc-shaped bistable control spring means at said second locations.

17. A suspension spring in accordance with claim 16, wherein the inclined surfaces of said one housing part and said other housing part at said first location are substantially parallel and wherein the inclined surfaces of said one housing part and said other housing part at said second locations are substantially parallel.

18. A suspension spring system in accordance with claim 14, wherein said disc-shaped bistable control spring means moves through an intermediate range as the disc-shaped bistable control spring means shifts from one of said final stable positions to the other of said final stable positions, said disc-shaped bistable control spring means being unstable in the intermediate range.

19. A suspension spring system comprising:
a housing;
a load supporting member at least partially positioned within said housing and movable with respect to said housing;
suspension spring means located in said housing for elastically supporting said load supporting member, said suspension spring means being compressible in an axial direction and comprising a soft rubber spring having a plurality of cavities therein; and
disc-shaped bistable control spring means located in said housing for influencing and controlling the spring characteristics of the suspension spring means, said disc-shaped bistable control spring means being mounted on said load supporting member and being radially compressed within said housing so as to be pre-stressed, said disc-shaped bistable control spring means being shiftable from a first final position, through an intermediate range and to a second final position in response to movement of said load supporting member, said first and second final positions of said disc-shaped bistable control spring means being stable and being located along the axis of compression of said suspension spring means, said intermediate range of said disc-shaped bistable control spring means being unstable.

20. A suspension spring system in accordance with claim 19, wherein said disc-shaped bistable control spring means has a substantially zero spring rate when the disc-shaped bistable control spring means is in the intermediate range.

21. A suspension spring system in accordance with claim 19, wherein said suspension spring means is an elastomeric member and said disc-shaped bistable control spring means is a rubber member.

22. A suspension spring system in accordance with claim 19, wherein when said disc-shaped bistable control spring means is in its first final position, said disc-shaped bistable control spring means is concave and when said disc-shaped bistable control spring means is in its second final position, said disc-shaped bistable control spring means is convex.

23. A suspension spring system in accordance with claim 6, wherein said disc-shaped bistable control spring means comprises several pressure springs that define a pressure spring system.

24. A suspension spring system in accordance with claim 11, wherein said disc-shaped bistable control spring means comprises several pressure springs that define a pressure spring system.

25. A suspension spring system in accordance with claim 19, wherein said disc-shaped bistable control spring means moves through an intermediate range as the disc-shaped bistable control spring means shifts from one of said final stable positions to the other of said final stable positions, said disc-shaped bistable control spring means being unstable in the intermediate range.

* * * * *